(12) United States Patent
Methenitis

(10) Patent No.: US 8,850,603 B2
(45) Date of Patent: Sep. 30, 2014

(54) SYSTEM AND METHOD FOR ENHANCING DEVICE PASSCODE SECURITY

(75) Inventor: Mark Methenitis, Dallas, TX (US)

(73) Assignee: MetroPCS Wireless Inc., Richardson, TX (US)

( * ) Notice: Subject to any disclaimer, the term of this patent is extended or adjusted under 35 U.S.C. 154(b) by 103 days.

(21) Appl. No.: 13/569,881

(22) Filed: Aug. 8, 2012

(65) Prior Publication Data

US 2014/0043243 A1    Feb. 13, 2014

(51) Int. Cl.
| | | |
|---|---|---|
| G06F 7/04 | (2006.01) | |
| G06F 17/30 | (2006.01) | |
| H04N 7/16 | (2011.01) | |
| G06F 21/31 | (2013.01) | |
| G06F 21/30 | (2013.01) | |
| G06F 21/36 | (2013.01) | |
| H04L 9/32 | (2006.01) | |
| H04L 29/06 | (2006.01) | |

(52) U.S. Cl.
CPC ............... G06F 21/30 (2013.01); G06F 21/31 (2013.01); H04L 9/3226 (2013.01); H04L 63/083 (2013.01); G06F 21/36 (2013.01)
USPC ............... 726/27; 726/28; 713/183; 345/173; 345/641

(58) Field of Classification Search
USPC ........ 713/183; 726/3–7, 26–28; 345/173, 641
See application file for complete search history.

(56) References Cited

U.S. PATENT DOCUMENTS

| | | | | |
|---|---|---|---|---|
| 8,145,912 | B2* | 3/2012 | McLean | 713/182 |
| 8,504,842 | B1* | 8/2013 | Meacham | 713/183 |
| 2006/0053301 | A1* | 3/2006 | Shin | 713/183 |
| 2008/0184360 | A1* | 7/2008 | Kornilovsky et al. | 726/17 |
| 2011/0004769 | A1* | 1/2011 | Won et al. | 713/183 |
| 2011/0191592 | A1* | 8/2011 | Goertzen | 713/182 |
| 2011/0300831 | A1* | 12/2011 | Chin | 455/411 |
| 2012/0159592 | A1* | 6/2012 | Griffin et al. | 726/7 |
| 2012/0159593 | A1* | 6/2012 | Griffin et al. | 726/7 |
| 2012/0266236 | A1* | 10/2012 | Miwa et al. | 726/19 |
| 2013/0053105 | A1* | 2/2013 | Lee et al. | 455/565 |
| 2013/0139248 | A1* | 5/2013 | Rhee et al. | 726/19 |
| 2013/0222256 | A1* | 8/2013 | Pasquero et al. | 345/169 |
| 2013/0333020 | A1* | 12/2013 | Deshpande | 726/16 |

* cited by examiner

*Primary Examiner* — Jeffrey Pwu
*Assistant Examiner* — Jayesh Jhaveri
(74) *Attorney, Agent, or Firm* — Howison & Arnott, LLP

(57) ABSTRACT

A method for entering a passcode within a mobile device begins with receiving an indication of a user attempt to access the mobile device. A passcode entry display including a plurality of touch points is generated responsive to the indication. Each of the plurality of touch points includes at least two visual identifiers associated therewith. The passcode entry display is displayed on an interface of the mobile device and the passcode is received responsive to user selection of a sequences of the plurality of touch points associated with a predetermined sequence of at least one of the visual identifiers. The arrangement of the at least two visual identifier associated with the plurality of touch points of each passcode entry display differs from an arrangement of the at least two visual identifiers in a previous and a subsequent passcode entry display.

26 Claims, 3 Drawing Sheets

SYSTEM AND METHOD FOR ENHANCING DEVICE PASSCODE SECURITY

TECHNICAL FIELD

The present invention relates to mobile device passcodes entry, and more particularly, to a manner for randomizing a display through which a passcode is entered on a mobile device display in order to prevent an unauthorized third party from determining the passcode.

BACKGROUND

A feature often found within mobile devices is some manner for entering a passcode in order to enable a user to activate the mobile device to enable full access to its various functionalities. A passcode entry process involves activating a keypad display upon the mobile device, and the user entering a passcode on the temporarily activated display which is displaying a keypad showing the numbers or letters that may be selected for passcode entry.

One problem with this type of passcode entry is that the display screen on which a user enters their passcode will often exhibit finger smudges or fingerprints due to the repeated entry of the passcode when the keypad is displayed in a constant position configuration. This would enable unauthorized third-party users the ability to merely press the numbers under the various finger smudges that are upon the display in order to obtain access to the mobile device.

One existing solution to this problem has involved the randomization of the keypad, such that the position of the digits or letters within a keypad are randomized and placed in different location after each passcode entry upon the mobile device. While this solution is useful for presenting access of the mobile device due to the viewing of keypad smudges, the method does not prevent other types of unauthorized entries such as an unauthorized third-party unobtrusively viewing a user's entry of their keypad code over their shoulder or from a distance, enabling the unauthorized party to obtain the keypad code via visual confirmation rather than relying upon the keypad smudges upon the electronic device.

Other types of mobile device keypad access processes also utilize the entry of a finger sliding across a sequence of points within an orientation of points on the display screen of the mobile device in a predetermined pattern and do not require a sequential entry of the points but a movement of the finger between the points in a designated pattern. This type of keypad entry passcode does not lend itself to the randomization of the components as a particular pattern on the dots is being reviewed for accuracy rather than a particular entry sequence of components. Thus, some manner for overcoming the shortcomings of the existing passcode entry problems would be beneficial to the improvement of security features within a mobile device.

SUMMARY

The present invention, as disclosed and described herein, in one aspect thereof, comprises a method for entering a passcode within a mobile device that begins with receiving an indication of a user attempt to access the mobile device. A passcode entry display including a plurality of touch points is generated responsive to the indication. Each of the plurality of touch points includes at least two visual identifiers associated therewith. The passcode entry display is displayed on an interface of the mobile device and the passcode is received responsive to user selection of a sequences of the plurality of touch points associated with a predetermined sequence of at least one of the visual identifiers. The arrangement of the at least two visual identifier associated with the plurality of touch points of each passcode entry display differs from an arrangement of the at least two visual identifiers in a previous and a subsequent passcode entry displays.

BRIEF DESCRIPTION OF THE DRAWINGS

For a more complete understanding, reference is now made to the following description taken in conjunction with the accompanying Drawings in which.

DETAILED DESCRIPTION

Figure 1:
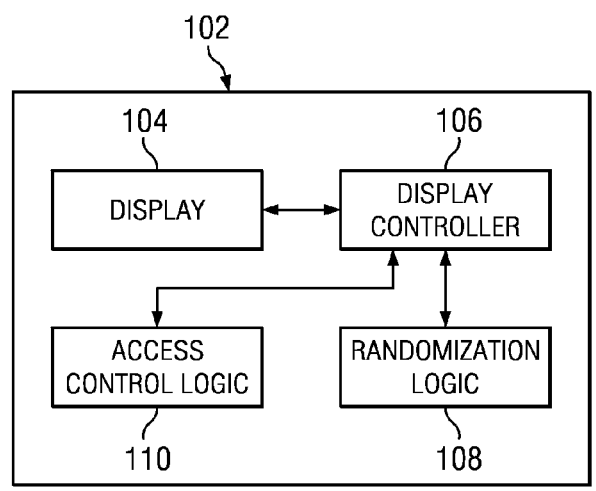
FIG. 1 is a block diagram of a mobile device implementing an enhanced passcode security feature.

Referring now to the drawings, wherein like reference numbers are used herein to designate like elements throughout, the various views and embodiments of a system and method for enhancing device passcode security are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a mobile device 102. The mobile device 102 can comprise any number of portable electronic devices such as a Smartphone, tablet computer, tablet device, pager, personal data assistant, laptop computer, or any other number of portable electronic devices. The mobile device 102 includes an interactive display 104 that displays information to a user. The display 104 will display an access screen to a user when a user is attempting to access the mobile device 102. The display 104 is provided via a display controller 106. The display controller 106 controls the interface that is provided on the display 104 controlling the manner in which a user may access the mobile device 102. Randomization logic 108 provides a manner for randomizing the access display provided by the display controller 106 on the display 104 in accordance with the processes described herein below. The display controller 106 works in conjunction with the randomization logic 108 and access control logic 110. The access control logic 110 controls whether or not a user is provided access to the remainder of the mobile device functions responsive to entry of the passcode through the display 104 that is under the control of the randomization logic 108.

Figure 2A:
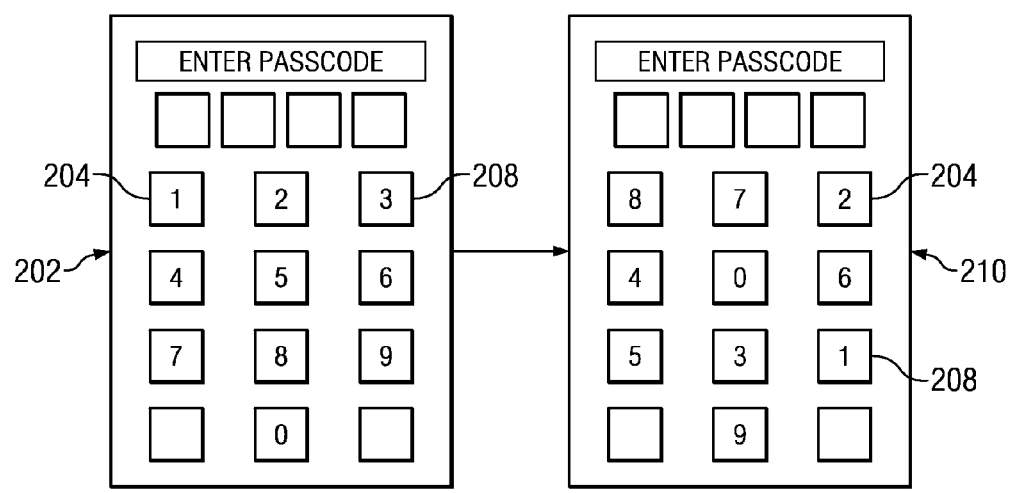
FIGS. 2A and 2B illustrate a first embodiment of a multilevel passcode security randomization process.

Referring now to FIG. 2A, there is illustrated a first embodiment of a multilevel randomization pattern that may be used for providing entry of a passcode to a mobile device 102. Two versions of a passcode entry interface are illustrated in FIG. 2A. The first version, 202, illustrates an initial interface that may be displayed to a user through the display 104 of the mobile device 102. The interface 202 illustrates a standard number pad configuration with the numbers beginning at the top right-hand corner and proceeding left to right and from top to bottom as a new row is presented. In addition to including the numerical characters 0 through 9 in interface 202, each of the numerical characters 204 have a different colored box 206 associated therewith. In addition to the colored box 206 surrounding the numerical character 204 additional levels of detail such as a pattern or symbol may also be associated with each of the numerical indicators 204 to provide further levels of detail.

Using either the numerical character 204 in the display interface or the colors of the boxes 206 surrounding the numerical characters 204, a user may enter a passcode to obtain access to the device. In one embodiment, the user may be entering the numerical characters 204 displayed by the display pad. In an alternative embodiment, the users could be selecting the colors displayed by the boxes 208 within the display. By utilizing a configuration that has two types of visual indicators associated with each touch point, i.e. a number and a color, an unauthorized third party surreptitiously viewing the user entering their keypad code would not know which item was being selected by the user. When the user entered a four digit code, the unauthorized third party user would not know whether the user was selecting the numbers associated with the entered code or the colors of the boxes 208 associated with the entered code. This way prevents the secret passcode from being easily obtained by an unauthorized third party.

In the interface illustrated in display 210, the pad configuration has been randomized such that the numerical characters 204 are now located in different positions from those indicated in display 202 and additionally the color indicators within the boxes 208 are also randomized to be in positions differing from those of display 202. Thus, when the passcode is entered by a user on the display 210, the fingerprint smudges would be placed in different locations than they were with respect to display 202. In this manner, a higher level of protection is provided to a user preventing unauthorized third parties from obtaining visual indications of their passcode and preventing the smudge pattern upon the display 104 from enabling a user to determine a user's passcode.

Figure 2B:
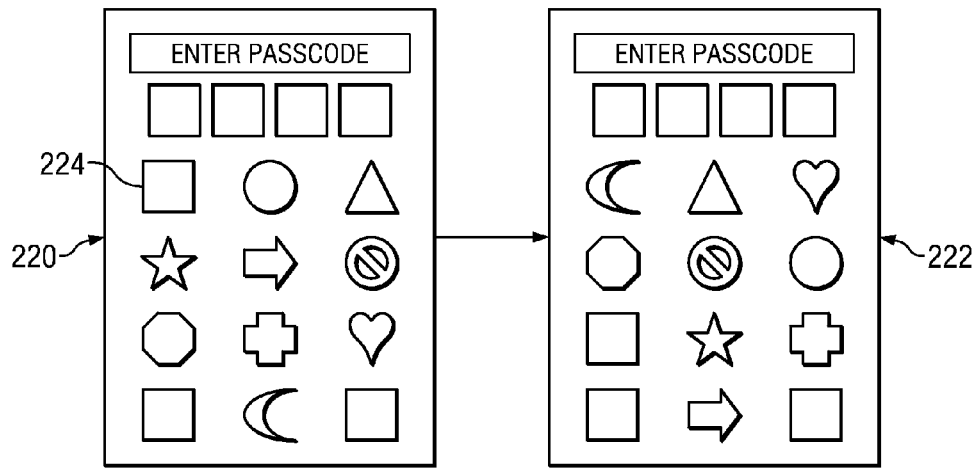

Referring now also to FIG. 2B, there are illustrated a pair of user displays 220 and 222. In the case of the displays 220 and 222, display 220 represents a first keypad entry display, wherein rather than utilizing numeric indicators a series of symbols 224 are provided upon the display 220. Each of the symbols 224 have a different color associated therewith. As before, the user will provide a four symbol passcode via the display 220, wherein the passcode may comprise either a sequence of symbols 224 illustrated in the display or may consist of a sequence of colors that are associated with the symbols wherein the user merely selects a color they are looking for without reference to the symbol that is being used to display the color.

In display 222, the sequence of symbols and colors have been randomized such that the symbols 224 are located in a differing position than they were previously and each of the colors of the symbols have been changed to a different color than they were in display 220. As before, this provides security to the user in first preventing visual determination of the user's passcode as an unauthorized viewer would not know whether the user was selecting the symbol or the color and also by moving the positions of the symbols and colors such that a smudge pattern would not develop to enable a party who obtained the mobile device to determine the access code from the smudge pattern.

Figure 3:
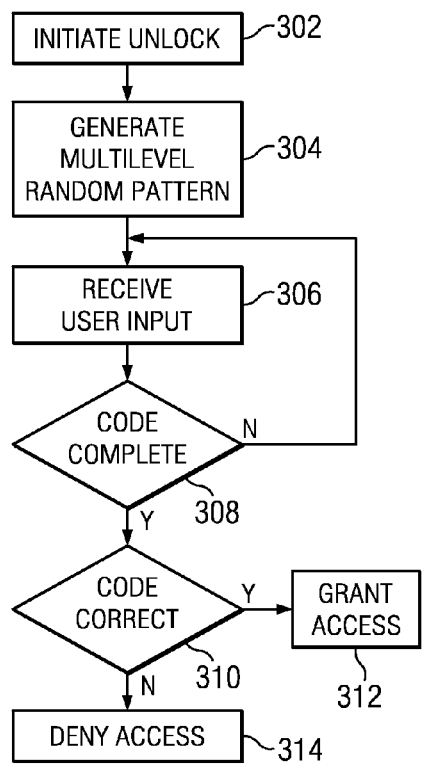
FIG. 3 is a flow diagram describing a first embodiment of the multilevel passcode randomization process.

Referring now to FIG. 3, there is illustrated a flow diagram describing a first embodiment of the multilevel randomization process as described with respect to FIG. 2. The user initiates an unlock process at step 302 in an attempt to obtain access to the functionalities of the mobile device. Initiation of the unlock process causes the generation of a multilevel random pattern at step 304 that provides a display screen including at least two differing factors associated with each touch position on the passcode entry display. The display receives the user input of the passcode at step 306 and inquiry step 308 determines if the code has been completely entered at step 308. If not, control passes back to step 306 to receive additional user input. Once inquiry step 308 determines that the passcode is complete, inquiry step 310 utilizes the access control logic 110 to determine if the correct passcode was entered. If so, control passes to step 312 to grant access to the functionalities of the mobile device to the user. If inquiry step 310 determines that an incorrect passcode was entered, access is denied to the user at step 314.

Figure 4:
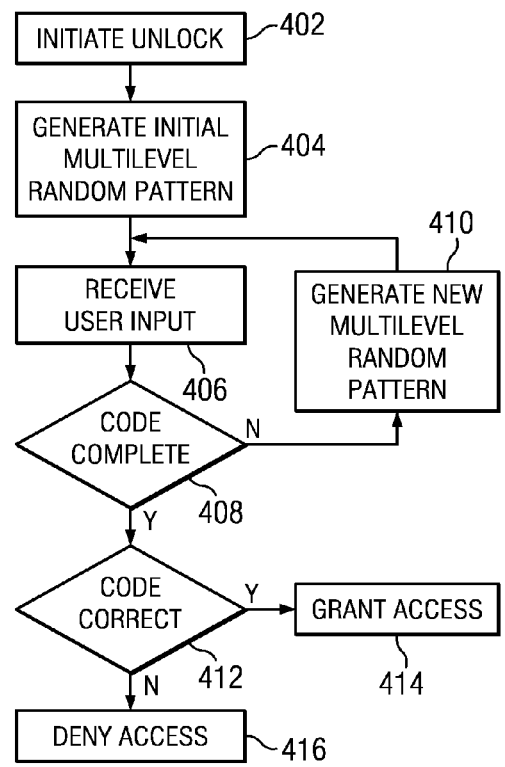
FIG. 4 is a flow diagram illustrating an alternative embodiment of the multilevel passcode randomization process.

Referring now to FIG. 4, there is illustrated an alternative embodiment wherein instead of enabling a user to enter a complete passcode upon a single randomization pattern, the pattern upon the user display is randomized after each passcode touch entry, such that when a single symbol, number or color is entered by a user, the passcode display is again randomized for the entry of the next passcode entry. Thus, when the user initiates an unlock process at step 402, the randomization logic 108 will generate an initial multilevel random pattern at step 404. The multilevel random pattern includes at least two different variables (color, symbol, alphanumeric character, pattern) associated with each touch point of the display. The display receives user input at step 406 on the passcode display for a first input. Inquiry step 408 determines if the complete passcode has been entered and if not, generates a new multilevel random pattern at step 410 to receive the entry of a next passcode input at step 406. Once inquiry step 408 determines that a final passcode entry has been received completing the passcode, control passes to inquiry step 412 which determines if a correct passcode was entered using the access control logic 110. If inquiry step 412 determines that a correct code was entered, the user is granted access at step 414 to the remaining functionalities of the mobile device 102. If inquiry step 412 determines that an incorrect passcode was entered, the user is denied access at step 416 to the functionalities of the mobile device 102.

While many mobile device access displays require the entry of a sequential passcode in order to obtain access to the device, other configurations for access are utilized. In one configuration rather than entering a sequential passcode in order to obtain access, a display screen is provided including a grid of touch nodes therein. The user is required to trace a predefined pattern through the grid of touch nodes such that a particular pattern is drawn on the display. In this case, the user does not touch each of the touch nodes in sequence but slides their finger from node to node to trace the pattern upon the grid of touch nodes. In this configuration, an authorized party can easily discern a pattern that must be drawn upon the access display in order to obtain access to the mobile device due to the smudge line indicated on the display. However, since a particular pattern must be drawn upon the touch nodes randomization of the touch nodes would not be a useful manner for disguising the smudge pattern upon the display.

Figure 5:
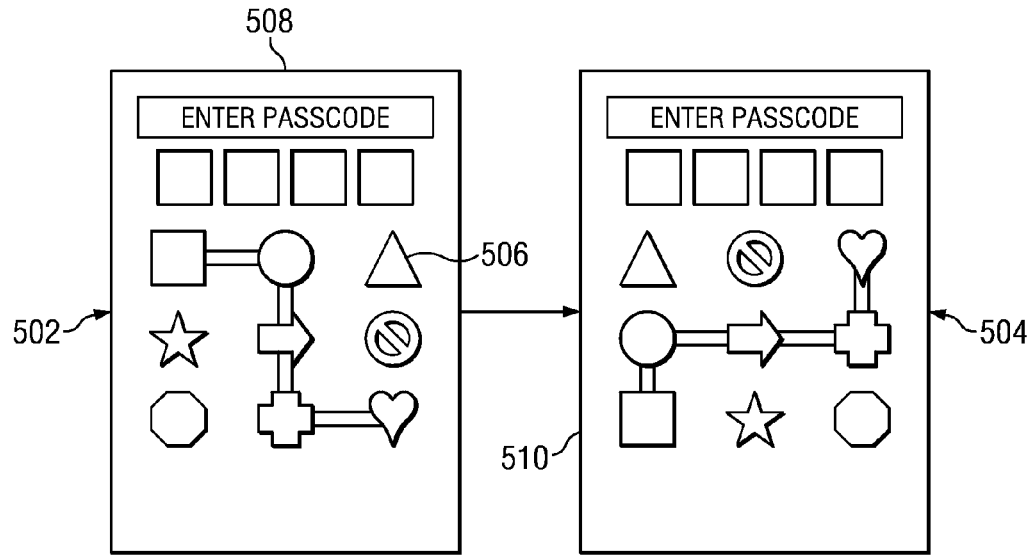
FIG. 5 illustrates an alternative embodiment of a passcode randomization process that randomizes an orientation of a pattern required to obtain entry to a mobile device.

In the embodiment illustrated in FIG. 5, there is illustrated a first access screen 502 and a second access screen 504. The first access screen 502 represents a display presented to a user for a first entry of the passcode, and the display 504 represents a display presented to the user for a subsequent passcode entry. Rather than randomizing the pattern of characters or symbols within the display, the orientation of the display is randomized. In FIG. 502, the access pattern required to access the mobile device requires the user to trace a short horizontal line followed by a longer vertical line and another shorter horizontal line. This pattern begins at the top right-hand corner and ends at the bottom left-hand corner. Rather than just displaying a set of dots or unidentified node, each of the contact points 506 have associated therewith a particular identifying symbol or other type of indicator. While the illustration in FIG. 5 shows the use of symbols associated with the contact node, it is also possible to use alphanumeric characters, colors, symbols, etc., in order to uniquely identify the nodes.

Thus, in the example of FIG. 5, the user knows that they must always begin their pattern at the square symbol that is located within the top right-hand corner of the symbol array. In display 502 this is achieved by holding the display with the edge 508 at the top. However, in the case of the display 504, the edge 510 would be held at the top and the pattern would then be traced as illustrated in display 504.

The example of FIG. 5 uses a grid touch pattern of nine points through which a user must trace a pattern among the touch points. The pattern would be easily visible based upon the smudge pattern left by the oil on the fingers upon the screen making it easy to determine the passcode if a same orientation of touch points were used for each access. However, the touch points could not be randomized because the pattern would be wrong not enabling the correct pattern to be traced. However, the touch point grid can be rotated 90, 180 or 270 degrees to preserve the pattern in a different orientation and defeat the finger smudging issue. Thus, the user must have some manner for knowing the key for orienting the screen.

A particular symbol or color may be associated with each of the four corner positions of the touch point grid or with the touch positions directly vertical and horizontal to the center point of the grid display. Thus, the user may know the correct orientation based upon the selected key touch point which would either be at the top left or top center of the display when the password was entered. This is achieved by having the symbol, character, color, etc., in the appropriate corner or position to set the orientation. This process could be expanded to include two simultaneous factors such as those disclosed with respect to FIGS. 2A and 2B that were each associated with a touch point and rotated by different amounts such that an observer would have to determine not only the pattern but the differences in the potential key patterns in order to determine the correct orientation.

Figure 6:
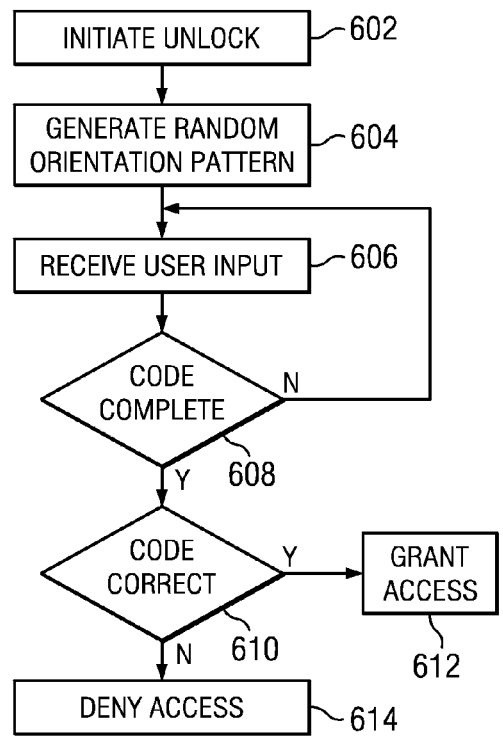
FIG. 6 is a flow diagram describing the randomization of the orientation of the pattern for entering a passcode within a mobile device.

Referring now to FIG. 6, there is illustrated a flow diagram describing the operation of a system utilizing the access system according to FIG. 5. The unlock process is initiated at step 602, and a display including a random orientation pattern is generated at step 604. A user provides input at step 606 after orienting the display in the proper orientation. Inquiry step 608 determines if a complete code has been entered and if not, control passes back to step 606 to receive the rest of the entry pattern. Once the complete code has been entered, the access control logic 110 determines if a correct code has been entered at inquiry step 610, and if so, access is granted at step 612 to the user. If an incorrect access code is entered at inquiry step 610, the user is denied access at step 614.

Using the above identified system and method, a user may protect their passcode entries from undesired third party interception both visually by the third party observing the user entering their passcode and when their mobile device is obtained by the third party by merely viewing the fingerprint smudge pattern upon the display of the access device. This process can provide an additional layer of security protection for the passcode and limit undesired accesses of their mobile device.

It will be appreciated by those skilled in the art having the benefit of this disclosure that this system and method for enhancing device passcode security provides a system and method for preventing an authorized third party from discerning a user's passcode. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for entering a passcode within a mobile device, comprising:
   receiving an indication of a user attempt to access the mobile device;
   generating responsive to the indication a passcode entry display including a plurality of touch points, each touch point remaining in a fixed position with respect to all of the other touch points during entry of the passcode, each of the plurality of touch points having at least two visual identifiers, at least one of the visual identifiers selectable as part of the passcode;
   displaying the passcode entry display on an interface of the mobile device;
   receiving the passcode based on user selection of a predetermined sequence of at least one of the visual identifiers associated with the plurality of touch points; and
   wherein an arrangement of the at least two visual identifiers associated with the plurality of touch points of each passcode entry display differs from an arrangement of the at least two visual identifiers in a previous and a subsequent passcode entry display.

2. The method of claim 1 further including comparing the received passcode with a predetermined passcode to determine whether to grant access to the mobile device.

3. The method of claim 1, wherein the step of generating further comprises the step of generating, responsive to the indication and to each selection of an input of the passcode, the passcode entry display including the plurality of touch points, each of the plurality of touch points including at least two visual identifiers associated therewith.

4. The method of claim 3, wherein the step of displaying further includes the step of displaying each of the passcode entry displays on the interface of the mobile device after receiving the indication and after each selection of the input of the passcode.

5. The method of claim 1, wherein the step of generating further includes the step of generating, responsive to the indication, the passcode entry display including the plurality of touch points, each of the plurality of touch points including an alpha-numeric visual identifier and a color visual identifier associated therewith.

6. The method of claim 1, wherein the step of generating further includes the step of generating, responsive to the indication, the passcode entry display including the plurality of touch points, each of the plurality of touch points including a symbol identifier and a color visual identifier associated therewith.

7. The method of claim 1, wherein the step of generating further includes the step of generating, responsive to the indication, the passcode entry display including the plurality of touch points, each of the plurality of touch points including an alpha-numeric visual identifier and a symbol identifier associated therewith.

8. A mobile device, comprising:
a display interface for displaying a passcode entry display and receiving entry of a passcode from a user attempting to access the mobile device;
a display controller for controlling passcode entry display, wherein the display controller is configured to:
receive an indication of the user attempting to access the mobile device;
generate, responsive to the indication, the passcode entry display including a single image including a plurality of touch points, each touch point remaining in a fixed position with respect to all of the other touch points during entry of the passcode, each of the plurality of touch points having at least two visual identifiers, at least one of the visual identifiers selectable as part of the passcode;
display the passcode entry display on the display interface of the mobile device;
receive the passcode based on user selection of a predetermined sequence of at least one of the visual identifiers associated with the plurality of touch points; and
wherein the arrangement of the at least two visual identifiers associated with the plurality of touch points of each passcode entry display differs from an arrangement of the at least two visual identifiers in a previous and a subsequent passcode entry display.

9. The mobile device of claim 8 further including access logic for comparing the received passcode with a predetermined passcode to determine whether to grant access to the mobile device.

10. The mobile device of claim 8, wherein the display controller is further configured to generate, responsive to the indication and to each selection of an input of the passcode, the passcode entry display including the plurality of touch points, each of the plurality of touch points including at least two visual identifiers associated therewith.

11. The mobile device of claim 10, wherein the display controller is further configured to display each of the passcode entry displays on the interface of the mobile device after receiving the indication and after each selection of the input of the passcode.

12. The mobile device of claim 8, wherein the display controller is further configured to generate, responsive to the indication, the passcode entry display including the plurality of touch points, each of the plurality of touch points including an alpha-numeric visual identifier and a color visual identifier associated therewith.

13. The mobile device of claim 8, wherein the display controller is further configured to generate, responsive to the indication, the passcode entry display including the plurality of touch points, each of the plurality of touch points including a symbol identifier and a color visual identifier associated therewith.

14. The mobile device of claim 8, wherein the display controller is further configured to generate, responsive to the indication, the passcode entry display including the plurality of touch points, each of the plurality of touch points including an alpha-numeric visual identifier and a symbol identifier associated therewith.

15. A method for entering a passcode within a mobile device, comprising:
receiving an indication of a user attempt to access the mobile device;
generating responsive to the indication a passcode entry display including an x by y array of touch points each having at least two visual identifiers, the at least two visual identifiers having a fixed relationship with respect to each other in the x by y array during selection of the passcode, the x by y array being oriented in one of four perpendicular orientations;
displaying the passcode entry display on an interface of the mobile device;
receiving the passcode based on user tracing of a predetermined continuous path between a selected portion of the plurality of touch points, each touch point remaining in a fixed position with respect to all of the other touch points during entry of the passcode; and
wherein a perpendicular orientation of the x by y array in a present passcode entry display differs from the perpendicular orientation of the x by y array in a previous and a subsequent passcode entry display.

16. The method of claim 15 further including the step of comparing the received passcode with a predetermined passcode to determine whether to grant access to the mobile device.

17. The method of claim 15, wherein each of the plurality of touch points of the x by y array each have at least two visual identifiers associated therewith.

18. The method of claim 17, wherein each of the plurality of touch points of the x by y array have an alpha-numeric visual identifier and a color visual identifier associated therewith.

19. The method of claim 17, wherein each of the plurality of touch points of the x by y array have a symbol identifier and a color visual identifier associated therewith.

20. The method of claim 17, wherein each of the plurality of touch points of the x by y array have an alpha-numeric visual identifier and a symbol identifier associated therewith.

21. A mobile device, comprising:
a display interface for displaying a passcode entry display and receiving entry of a passcode from a user attempting to access the mobile device;
a display controller for controlling the interface, wherein the display controller is configured to:
receive an indication of the user attempting to access the mobile device;
generate responsive to the indication a passcode entry display including a single image of an x by y array of touch points each having at least two visual identifiers, the at least two visual identifiers having a fixed relationship with respect to each other in the x by y array during selection of the passcode, the x by y array being oriented in one of four perpendicular orientations;
display the passcode entry display on the display interface of the mobile device;
receive the passcode based on user tracing of a predetermined continuous path between a selected portion of the plurality of touch points, each touch point remaining in a fixed position with respect to all of the other touch points during entry of the passcode; and
wherein a perpendicular orientation of the x by y array in a present passcode entry display differs from the perpendicular orientation of the x by y array in a previous and a subsequent passcode entry display.

22. The mobile device of claim 21 further including access logic for comparing the received passcode with a predetermined passcode to determine whether to grant access to the mobile device.

23. The mobile device of claim 21, wherein each of the plurality of touch points of the x by y array each have at least two visual identifiers associated therewith.

24. The mobile device of claim 23, wherein each of the plurality of touch points of the x by y array have an alphanumeric visual identifier and a color visual identifier associated therewith.

25. The mobile device of claim 23, wherein each of the plurality of touch points of the x by y array have a symbol identifier and a color visual identifier associated therewith.

26. The mobile device of claim 23, wherein each of the plurality of touch points of the x by y array have an alphanumeric visual identifier and a symbol identifier associated therewith.

* * * * *